(12) United States Patent
Risvik et al.

(10) Patent No.: US 9,342,582 B2
(45) Date of Patent: May 17, 2016

(54) SELECTION OF ATOMS FOR SEARCH ENGINE RETRIEVAL

(75) Inventors: Knut Magne Risvik, Mo I Rana (NO);
Mike Hopcroft, Kirkland, WA (US);
John G. Bennett, Bellevue, WA (US);
Karthik Kalyanaraman, Bellevue, WA (US);
Trishul Chilimbi, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 13/045,278

(22) Filed: Mar. 10, 2011

(65) Prior Publication Data

US 2012/0130981 A1 May 24, 2012

Related U.S. Application Data

(63) Continuation-in-part of application No. 12/951,528, filed on Nov. 22, 2010, now Pat. No. 8,620,907.

(51) Int. Cl.
  *G06F 17/30* (2006.01)
  *G06F 7/00* (2006.01)
  *G06F 17/00* (2006.01)

(52) U.S. Cl.
  CPC ...... *G06F 17/30616* (2013.01); *G06F 17/3002* (2013.01); *G06F 17/30312* (2013.01)

(58) Field of Classification Search
  CPC .......... G06F 17/30312; G06F 17/3002; G06F 17/30616
  USPC ............................ 707/741, 999.001–999.005
  See application file for complete search history.

(56) References Cited

U.S. PATENT DOCUMENTS

| | | | |
|---|---|---|---|
| 4,769,772 A | 9/1988 | Dwyer | |
| 5,193,180 A | 3/1993 | Hastings | |
| 5,640,487 A * | 6/1997 | Lau et al. | 704/243 |
| 6,167,397 A | 12/2000 | Jacobson et al. | |
| 6,173,298 B1 * | 1/2001 | Smadja | 715/209 |
| 6,507,829 B1 * | 1/2003 | Richards et al. | 706/45 |

(Continued)

FOREIGN PATENT DOCUMENTS

| | | |
|---|---|---|
| CN | 1517914 | 8/2004 |
| CN | 1670723 | 9/2005 |

(Continued)

OTHER PUBLICATIONS

Pike, et al., "Interpreting the Data: Parallel Analysis with Sawzall," In Scientific Programming—Dynamic Grids and Worldwide Computing, vol. 13, Issue 4, 2005, pp. 1-33.
Shah, et al., "Flux: An Adaptive Partitioning Operator for Continuous Query Systems," 19th International Conference on Data Engineering (ICDE'03), 2003, 16 pp.
Tamura, et al., "Parallel Database Processing on a 100 Node PC Cluster: Cases for Decision Support Query Processing and Data Mining," In Proceedings of the 1997 ACM/IEEE conference on Supercomputing (CDROM), 1997, 16 pp.

(Continued)

*Primary Examiner* — Kannan Shanmugasundaram
(74) *Attorney, Agent, or Firm* — Jessica Meyers; Jim Ross; Micky Minhas

(57) ABSTRACT

Methods are provided for populating search indexes with atoms identified in documents. Documents that are to be indexed are identified, and for each document, atoms are identified and are categorized as unigrams, n-grams, and n-tuples. A list of atom/document pairs is generated such that an information metric can be computed for each pair. An information metric represents a ranking of the atom in relation to the particular document. Based on the information metric, some atom/document pairs are discarded and others are indexed.

20 Claims, 9 Drawing Sheets

(56) References Cited

U.S. PATENT DOCUMENTS

| | | | |
|---|---|---|---|
| 6,807,545 B1 * | 10/2004 | VanDamme | 707/999.002 |
| 6,901,411 B2 * | 5/2005 | Li et al. | 707/999.003 |
| 6,999,958 B2 | 2/2006 | Carlson et al. | |
| 7,152,064 B2 | 12/2006 | Bourdoncle et al. | |
| 7,305,385 B1 | 12/2007 | Dzikiewicz et al. | |
| 7,330,857 B1 | 2/2008 | Svingen et al. | |
| 7,421,418 B2 | 9/2008 | Nakano | |
| 7,596,745 B2 | 9/2009 | Dignum et al. | |
| 7,761,407 B1 | 7/2010 | Stern | |
| 7,783,644 B1 | 8/2010 | Petrou et al. | |
| 7,792,846 B1 | 9/2010 | Raffill et al. | |
| 7,930,290 B2 | 4/2011 | Farouki | |
| 7,966,307 B2 | 6/2011 | Iwayama et al. | |
| 7,984,043 B1 | 7/2011 | Waas | |
| 8,010,482 B2 | 8/2011 | Andersen et al. | |
| 8,166,203 B1 | 4/2012 | Yang | |
| 8,255,386 B1 | 8/2012 | Annau et al. | |
| 8,527,523 B1 | 9/2013 | Ravid | |
| 2002/0032772 A1 | 3/2002 | Olstad | |
| 2002/0129015 A1 | 9/2002 | Caudill et al. | |
| 2003/0191737 A1 | 10/2003 | Steele et al. | |
| 2003/0217052 A1 | 11/2003 | Rubenczyk et al. | |
| 2004/0044952 A1 * | 3/2004 | Jiang et al. | 715/500 |
| 2004/0098399 A1 | 5/2004 | Risberg et al. | |
| 2004/0133557 A1 | 7/2004 | Wen et al. | |
| 2004/0139167 A1 | 7/2004 | Edsall et al. | |
| 2005/0010560 A1 | 1/2005 | Altevogt et al. | |
| 2005/0210383 A1 * | 9/2005 | Cucerzan et al. | 715/533 |
| 2005/0283526 A1 | 12/2005 | O'Neal et al. | |
| 2006/0018551 A1 | 1/2006 | Patterson | |
| 2006/0020571 A1 | 1/2006 | Patterson | |
| 2006/0080311 A1 | 4/2006 | Potok et al. | |
| 2006/0155690 A1 * | 7/2006 | Wen et al. | 707/3 |
| 2006/0195440 A1 | 8/2006 | Burges et al. | |
| 2006/0248066 A1 | 11/2006 | Brewer | |
| 2007/0040813 A1 * | 2/2007 | Kushler et al. | 345/173 |
| 2007/0078653 A1 * | 4/2007 | Olsen | 704/240 |
| 2007/0250501 A1 * | 10/2007 | Grubb et al. | 707/5 |
| 2008/0027920 A1 | 1/2008 | Schipunov et al. | |
| 2008/0028010 A1 | 1/2008 | Ramsey | |
| 2008/0059187 A1 * | 3/2008 | Roitblat et al. | 707/5 |
| 2008/0059489 A1 | 3/2008 | Han et al. | |
| 2008/0059512 A1 * | 3/2008 | Roitblat et al. | 707/102 |
| 2008/0082520 A1 | 4/2008 | Bohn et al. | |
| 2008/0114750 A1 | 5/2008 | Saxena et al. | |
| 2008/0216715 A1 | 9/2008 | Langford | |
| 2009/0012956 A1 * | 1/2009 | Wen et al. | 707/5 |
| 2009/0070322 A1 | 3/2009 | Salvetti et al. | |
| 2009/0132541 A1 | 5/2009 | Barsness et al. | |
| 2009/0216715 A1 | 8/2009 | Dexter | |
| 2009/0216740 A1 * | 8/2009 | Ramakrishnan et al. | 707/5 |
| 2009/0248669 A1 * | 10/2009 | Shetti et al. | 707/5 |
| 2009/0271385 A1 | 10/2009 | Krishnamoorthy et al. | |
| 2010/0114561 A1 * | 5/2010 | Yasin | 704/9 |
| 2010/0138426 A1 * | 6/2010 | Nakayama et al. | 707/741 |
| 2010/0205172 A1 | 8/2010 | Luk | |
| 2010/0318516 A1 | 12/2010 | Kolen et al. | |
| 2010/0318519 A1 * | 12/2010 | Hadjieleftheriou et al. | 707/742 |
| 2011/0093459 A1 | 4/2011 | Dong et al. | |
| 2011/0191310 A1 | 8/2011 | Liao et al. | |
| 2012/0130925 A1 | 5/2012 | Risvik et al. | |

FOREIGN PATENT DOCUMENTS

| | | |
|---|---|---|
| CN | 1728143 | 2/2006 |
| CN | 101322125 | 12/2008 |
| CN | 101388026 | 3/2009 |
| CN | 101393565 | 3/2009 |
| CN | 101583945 | 11/2009 |

OTHER PUBLICATIONS

Ganti, et al., "Preconnputing Search Features for Fast and Accurate Query Classification," In: Third ACM International Conference on Web Search and Data Mining, Feb. 4-6, 2010, 10 pages, New York City, NY.

Tandon, et al., "Information Extraction from Web-Scale N-Gram Data," In: Special Interest Group on Information Retrieval Web N-Gram Workshop, 2010, 8 pages.

Zobel, et al., "Finding Approximate Matches in Large Lexicons," Software—Practice and Experience, Mar. 1995, by John Wiley & Sons, Ltd., pp. 331-345, vol. 25, Issue 3, Australia.

Notice of Allowance and Fee(s) Due in U.S. Appl. No. 12/951,747, mailed Dec. 11, 2013, 35 pages.

Non Final Office Action in U.S. Appl. No. 13/932,866, mailed Dec. 20, 2013, 19 pages.

Non-Final Office Action in U.S. Appl. No. 12/951,747, mailed Nov. 1, 2012.

Non-Final Office Action dated Sep. 25, 2012 in U.S. Appl. No. 12/951,528, 15 pages.

Chinese Office Action dated Sep. 16, 2014 in Chinese Application No. 201110373395.6, 6 pages.

Non-Final Office Action dated Nov. 2, 2012 in U.S. Appl. No. 12/951,815, 8 pages.

Non-Final Office Action dated Apr. 11, 2014 in U.S. Appl. No. 12/951,815, 9 pages.

Notice of Allowance dated Apr. 11, 2014 in U.S. Appl. No. 13/932,866, 7 pages.

Chinese Office Action dated Aug. 11, 2014 in Chinese Application No. 201110373345.8, 6 pages.

Final Office Action dated Nov. 6, 2014 in U.S. Appl. No. 12/951,815, 13 pages.

Non-Final Office Action dated Aug. 19, 2014 in U.S. Appl. No. 12/951,799, 11 pages.

Final Office Action dated Nov. 2, 2012 in U.S. Appl. No. 12/951,799, 11 pages.

Final Office Action in U.S. Appl. No. 13/072,419, mailed Aug. 9, 2013, 45 pages.

Notice of Allowance in U.S. Appl. No. 12/951,528 mailed Aug. 26, 2013, 33 pages.

International Search Report and Written Opinion in PCT/US2011/059834, mailed May 23, 2012.

Non-Final Office Action in U.S. Appl. No. 13/072,419 mailed Jan. 15, 2013, 69 pages.

Notice of Allowance in U.S. Appl. No. 12/951,659, mailed Mar. 8, 2013, 51 pages.

Zhuang, et al., Re-Ranking Search Results Using Query Logs, 2006, ACM, pp. 1-2.

Final Office Action in U.S. Appl. No. 12/951,815, mailed Apr. 10, 2013, 14 pages.

Final Office Action in U.S. Appl. No. 12/951,747, mailed Apr. 9, 2013, 16 pages.

Final Office Action in U.S. Appl. No. 12/951,528, mailed Apr. 8, 2013, 22 pages.

International Search Report and Written Opinion in PCT/US2011/059650, mailed Apr. 10, 2012.

Non-final Office Action mailed Apr. 11, 2012 in U.S. Appl. No. 12/951,528.

Non-Final Office Action mailed Apr. 17, 2012 in U.S. Appl. No. 12/951,815.

Non-Final Office Action mailed Apr. 5, 2012 in U.S. Appl. No. 12/951,747.

Non-Final Office Action mailed Apr. 13, 2012 in U.S. Appl. No. 12/951,799.

Final Office Action dated Mar. 12, 2015 in U.S. Appl. No. 12/951,799, 12 pages.

Non-Final Office Action dated Jun. 17, 2015 in U.S. Appl. No. 12/951,815, 12 pages.

Notice of Allowance dated Jul. 10, 2015 in U.S. Appl. No. 13/072,419, 16 pages.

\* cited by examiner

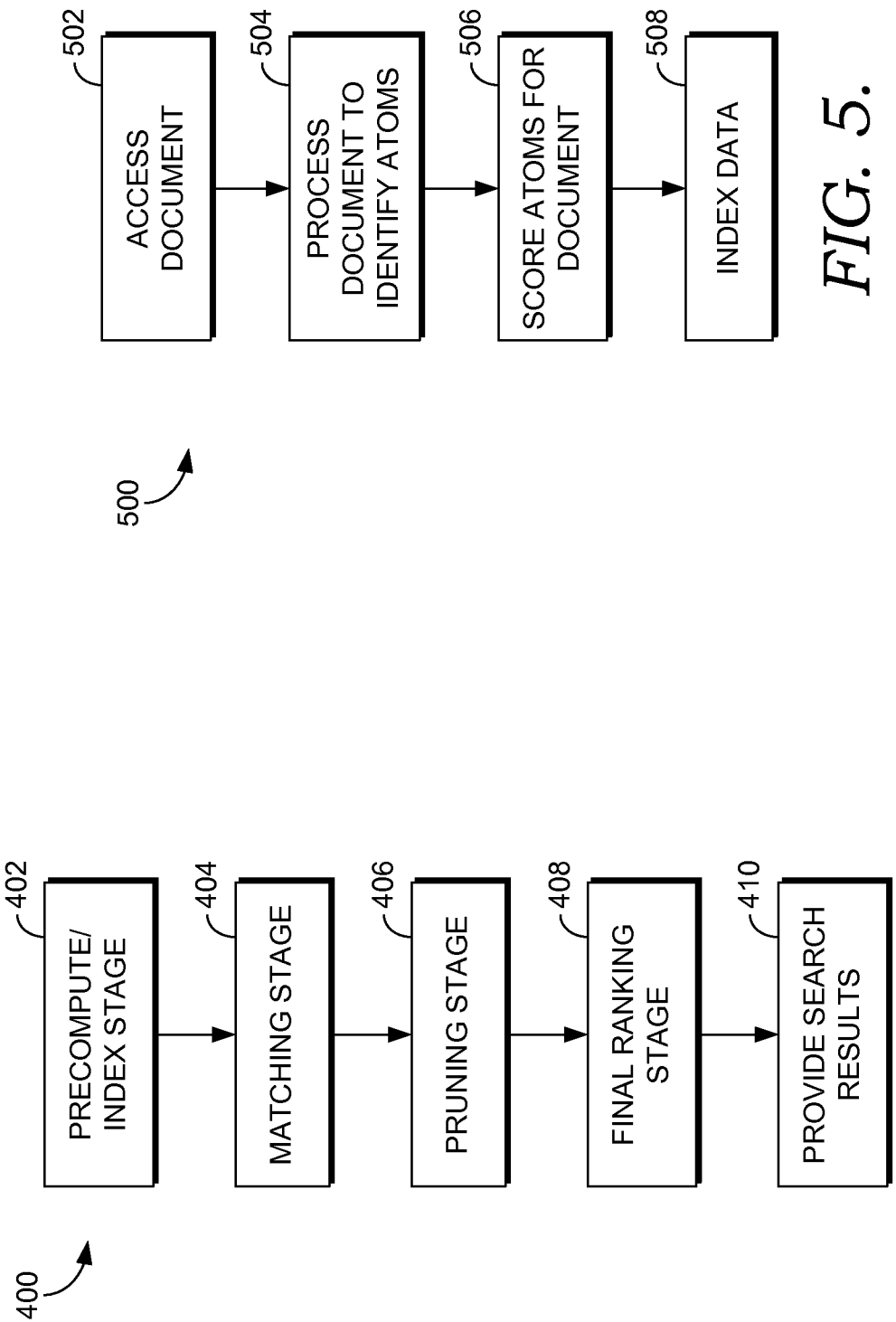

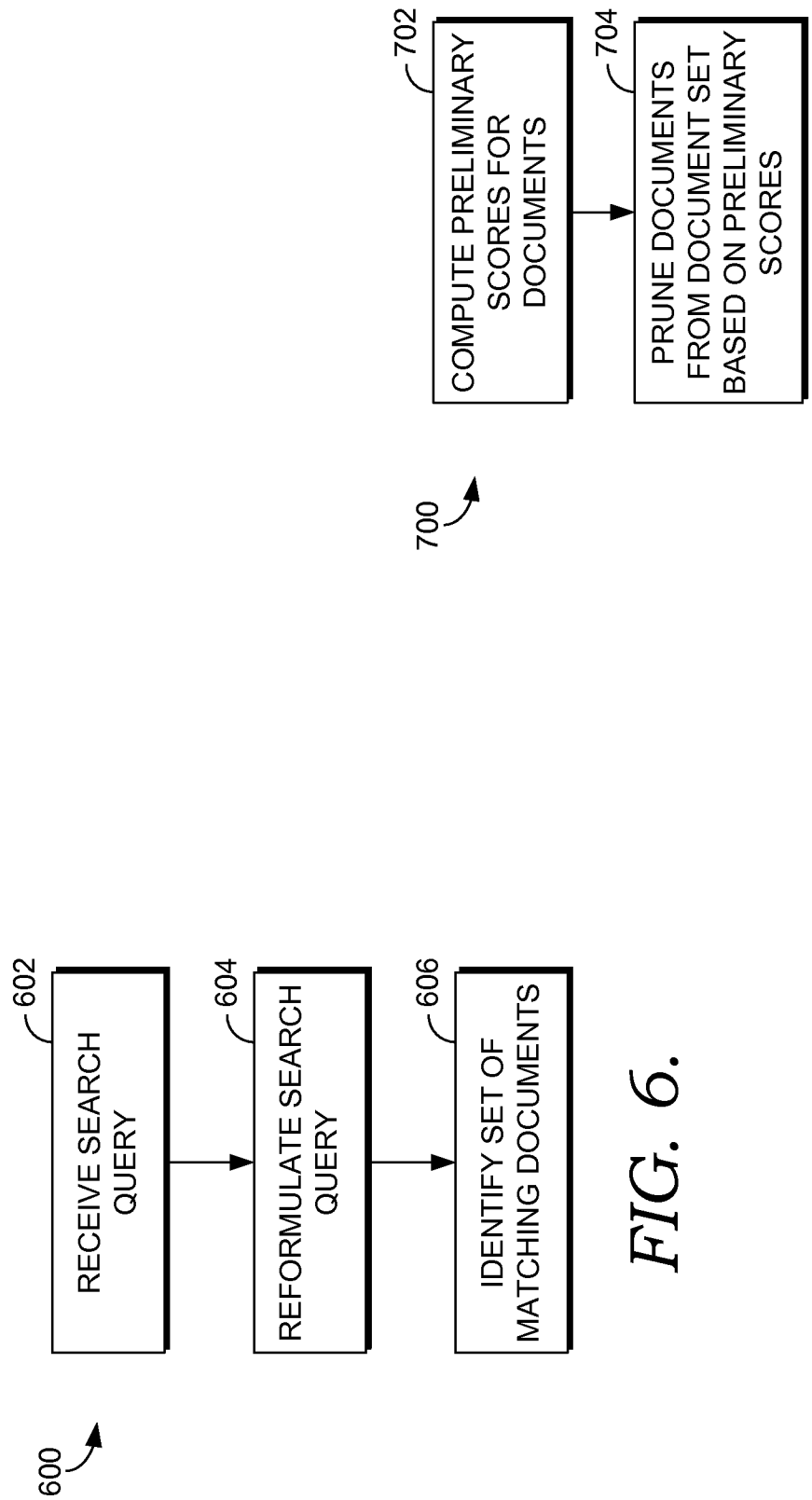

FIG. 9A.

| UNIGRAMS |
|---|
| (HOLISTIC, R) |
| (APPROACH, R) |
| (IN, R) |
| (SOUTHERN, R) |
| (SWEDEN, R) |

| N-GRAMS |
|---|
| ((HOLISTIC APPROACH), R) |
| ((APPROACH IN), R) |
| ((IN SOUTHERN), R) |
| ((SOUTHERN SWEDEN), R) |
| ((HOLISTIC APPROACH IN), R) |
| ((APPROACH IN SOUTHERN), R) |
| ((IN SOUTHERN SWEDEN), R) |

| ATOM TUPLES |
|---|
| (HOLISTIC, APPROACH) |
| (HOLISTIC, IN) |
| (HOLISTIC, SOUTHERN) |
| (HOLISTIC, SWEDEN) |
| (APPROACH, IN) |
| (APPROACH, SOUTHERN) |
| (APPROACH, SWEDEN) |
| (IN, SOUTHERN) |
| (IN, SWEDEN) |
| (SOUTHERN, SWEDEN) |
| ("HOLISTIC APPROACH", IN) |
| ("HOLISTIC APPROACH", "SOUTHERN SWEDEN") |
| (IN, "SOUTHERN SWEDEN") |

920

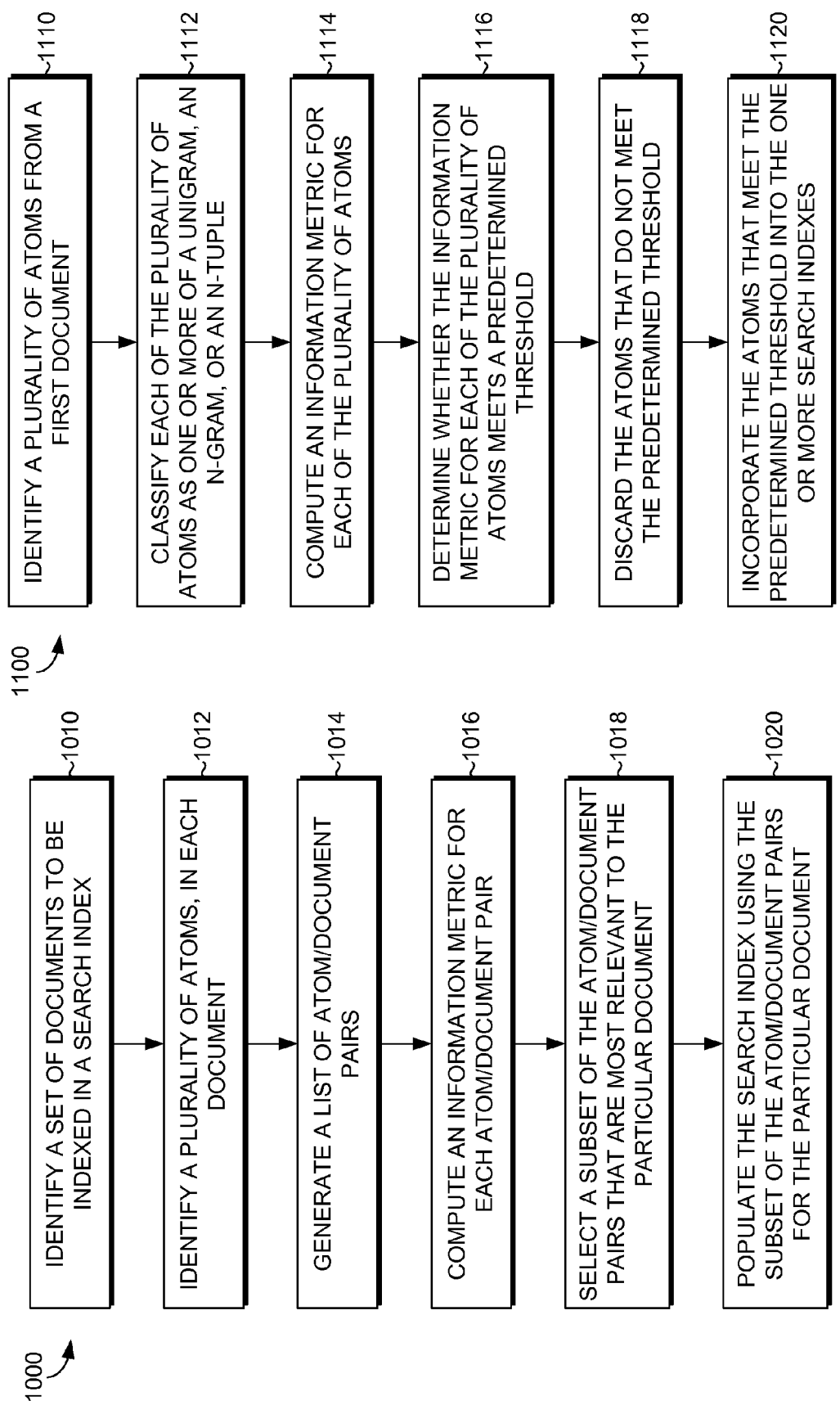

SELECTION OF ATOMS FOR SEARCH ENGINE RETRIEVAL

CROSS-REFERENCE TO RELATED APPLICATIONS

This application is continuation-in-part of U.S. application Ser. No. 12/951,528, entitled "MATCHING FUNNEL FOR LARGE DOCUMENT INDEX," filed on Nov. 22, 2010, the entirety of which is hereby incorporated by reference.

BACKGROUND

The amount of information and content available on the Internet continues to grow rapidly. Given the vast amount of information, search engines have been developed to facilitate searching for electronic documents. In particular, users may search for information and documents by entering search queries comprising one or more terms that may be of interest to the user. After receiving a search query from a user, a search engine identifies documents and/or web pages that are relevant based on the search query. Because of its utility, web searching, that is, the process of finding relevant web pages and documents for user issued search queries has arguably become the most popular service on the Internet today.

Search engines operate by crawling documents and indexing information regarding the documents in a search index. When a search query is received, the search engine employs the search index to identify documents relevant to the search query. Use of a search index in this manner allows for fast retrieval of information for queries. Without a search index, a search engine would need to search the corpus of documents to find relevant results, which would take an unacceptable amount of time.

As the Internet continues to grow, the number of searchable documents that may be crawled and indexed in a search index has become extremely large. As a result, it has not been feasible for search engines to index information regarding all web documents. For instance, an inordinate amount of hardware storage would be required. Additionally, the processing time required to retrieve results from an extremely large index would be unacceptable. Nonetheless, search engines strive to index as many documents as feasible to provide search results to any query while being cost-effective and able to provide relevant results in amount of time that is acceptable to end users.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to the population of one or more search indexes with atoms that have been identified from various documents. Atoms may be unigrams, n-grams, or n-tuples. A list of atom/document pairs is generating, such that the atoms can be identified as being from a particular document based on a document identification, for example. For each atom/document pair, an information metric is computed which represents an approximation of how relevant the atom is in relation to a particular document. Many factors are used in computing the information metric, such as a frequency that the atom appears in the document, the proximity of terms that comprise the atom in the document, how related the terms are, whether the terms have been linked together by inspection of query logs, etc. In some instances, a machine-learning tool is used to compute information metrics. Atom/documents pairs whose information metric meets or exceeds a certain threshold are indexed in a search index, while those that do not are discarded and thus are not indexed.

BRIEF DESCRIPTION OF THE DRAWINGS

The present invention is described in detail below with reference to the attached drawing figures, wherein:

FIG. 4 is a flow diagram showing a method for a staged process to return search results in response to a search query in accordance with an embodiment of the present invention;

FIG. 5 is a flow diagram showing a method for generating a search index during a pre-compute/index stage in accordance with an embodiment of the present invention;

FIG. 6 is a flow diagram showing a method for identifying an initial set of matching documents during a matching phase in accordance with an embodiment of the present invention;

FIG. 7 is a flow diagram showing a method for pruning documents from an initial set of matching documents during a pruning phase in accordance with an embodiment of the present invention;

FIGS. 9A, 9B, and 9C illustrate examples of entries in a unigram search index, an n-gram search index, and an n-tuple search index, respectively, in accordance with embodiments of the present invention;

FIG. 10 is a flow diagram showing a method for populating one or more search indexes with atoms identified in a plurality of documents, in accordance with an embodiment of the present invention;

FIG. 11 is a flow diagram showing a method for populating one or more search indexes with atoms identified in a plurality of documents, in accordance with an embodiment of the present invention.

DETAILED DESCRIPTION

Figure 1:
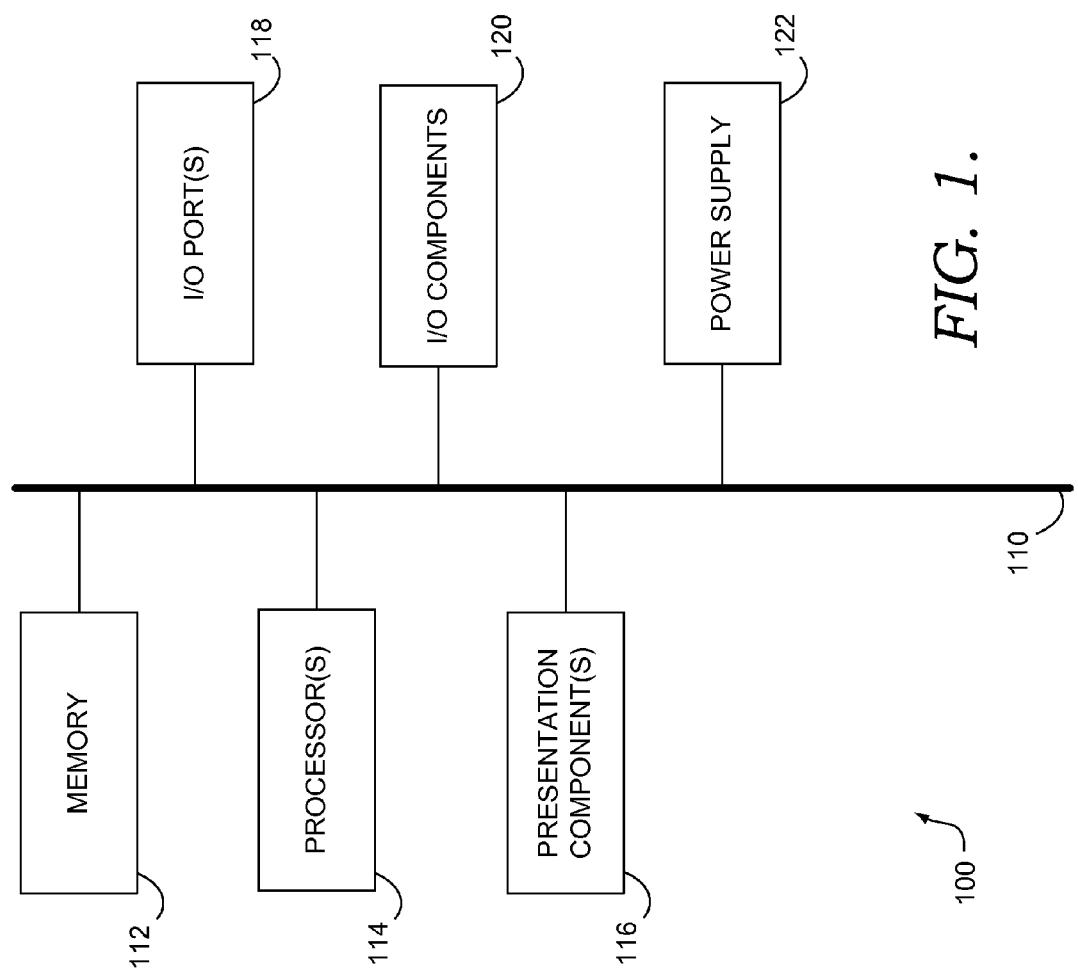
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide an indexing and searching process that allows for a large number of documents to be indexed and searched in a cost-effective manner and that meets strict latency constraints. In accordance with embodiments of the present invention, a process is employed that evaluates and prunes away document candidates in multiple stages. Conceptually, the process looks like a funnel as document candidates are evaluated and pruned away as the analysis becomes more complex through the stages. As the process continues through the stages, more expensive computations are applied and the number of candidate documents may be reduced by multiple orders of magnitude. Different strategies are applied at each of the stages to allow a quick and efficient approach to returning search results from a large number of documents. Additionally, the strategies used at each stage may be designed to complement the strategies used at other stages to make the process more efficient.

The search index employed by embodiments of the present invention indexes higher order primitives or "atoms" from documents, as opposed to simply indexing single terms. As used herein, an "atom" may refer to a variety of units of a query or a document. These units may include, for example, a term, an n-gram, an n-tuple, a k-near n-tuple, etc. A term maps down to a single symbol or word as defined by the particular tokenizer technology being used. A term, in one embodiment is a single character. In another embodiment, a term is a single word or grouping of words. An n-gram is a sequence of "n" number of consecutive or almost consecutive terms that may be extracted from a document. An n-gram is said to be "tight" if it corresponds to a run of consecutive terms and is "loose" if it contains terms in the order they appear in the document, but the terms are not necessarily consecutive. Loose n-grams are typically used to represent a class of equivalent phrases that differ by insignificant words (e.g., "if it rains I'll get wet" and "if it rains then I'll get wet"). An n-tuple, as used herein, is a set of "n" terms that co-occur (order independent) in a document. Further, a k-near n-tuple, as used herein, refers to a set of "n" terms that co-occur within a window of "k" terms in a document. Thus, an atom is generally defined as a generalization of all of the above. Implementations of embodiments of the present invention may use different varieties of atoms, but as used herein, atoms generally describes each of the above-described varieties.

When building the search index, each document is analyzed to identify atoms in the document and to generate a pre-computed score or rank for each atom that represents the atom's importance or relevance to the context of the documents. The search index stores information regarding the pre-computed scores generated for document/atom pairs, which are used during the funnel process.

Figure 2:
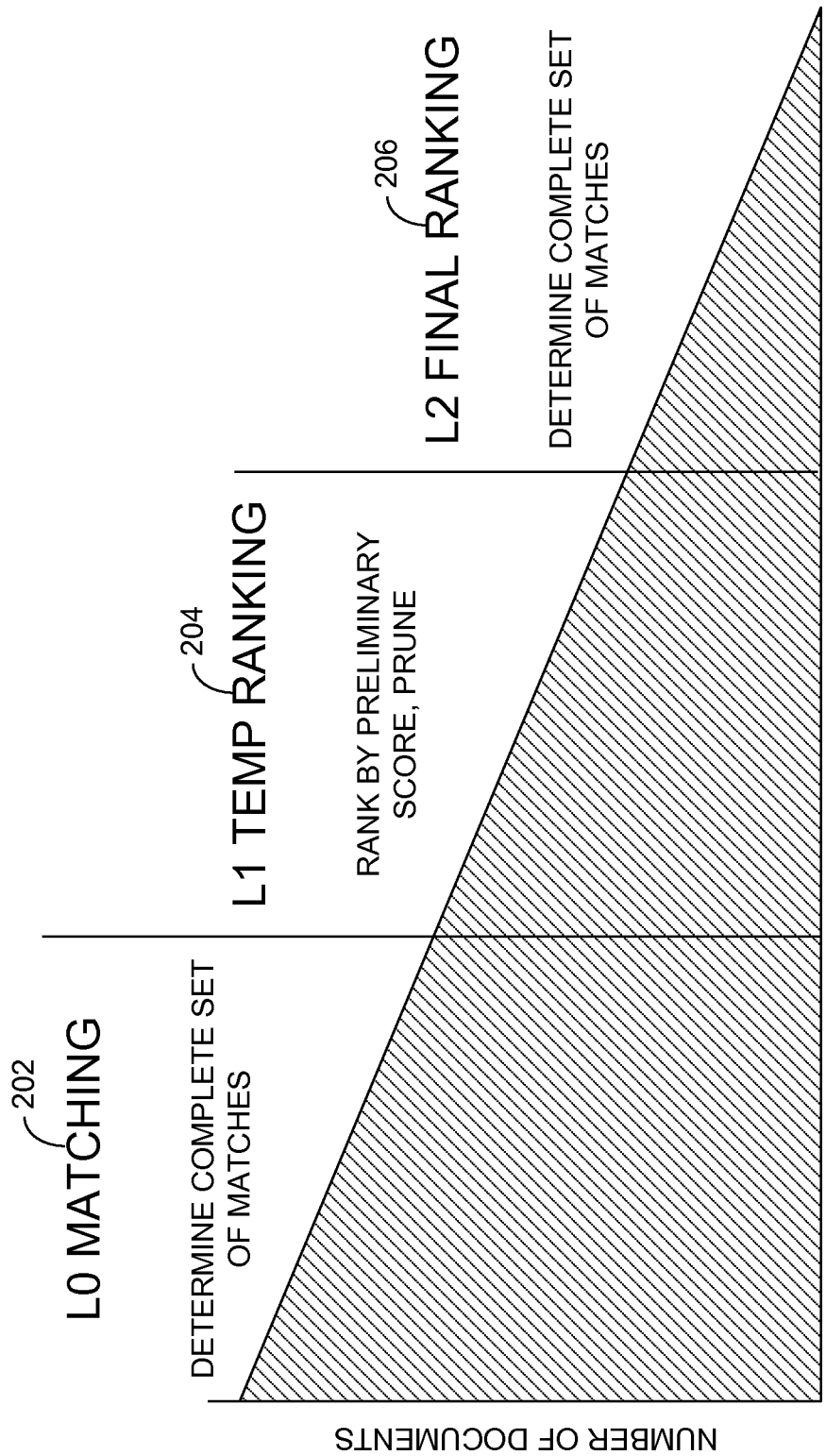
FIG. 2 is a diagram illustrating a smart funnel to reduce document candidates for retrieving a set of ranked documents in accordance with an embodiment of the present invention.

FIG. 2 illustrates the multiple stages of a funnel process in accordance with one embodiment of the present invention. The stages of the process shown in FIG. 2 are performed after a search query is received and include: an L0 matching stage 202, an L1 temporary ranking stage 204, and an L2 final ranking stage 206. As represented in FIG. 2, the number of candidate documents is reduced as the process progresses.

When a search query is received, the search query is analyzed to identify atoms. The atoms are used during the L0 matching stage 202 to query the search index and identify an initial set of matching documents that contain the atoms from the search query. As shown in FIG. 2, this may reduce the number of candidate documents from all documents indexed in the search index to those documents matching the atoms from the search query.

In the L1 temporary ranking stage 204, a simplified scoring function is used to compute a preliminary score for candidate documents retained from the L0 matching stage 202. The simplified scoring function operates on, among other things, the pre-computed scores stored in the search index for document/atom pairs. In some embodiments, the simplified scoring function may serve as an approximation of the final ranking algorithm that will ultimately be used to rank documents. However, the simplified scoring function provides a less expensive operation than the final ranking algorithm allowing for a larger number of candidate documents to be processed quickly. Candidate documents are pruned based on the preliminary score. For instance, only the top N documents having the highest preliminary scores may be retained.

In the L2 final ranking stage 206, the candidate documents retained from the L1 temporary ranking stage 204 are evaluated using a final ranking algorithm. The final ranking algorithm is a more expensive operation with a larger number of ranking features when compared with the simplified scoring function used during the L1 temporary ranking stage 204. However, the final ranking algorithm is applied to a much smaller number of candidate documents. The final ranking algorithm provides a set of ranked documents, and search results are provided in response to the original search query based on the set of ranked documents.

Accordingly, in one aspect, an embodiment of the present invention is directed to one or more computer storage media storing computer-useable instructions that, when used by a computing device, cause the computing device to perform a method. The method includes receiving a search query and reformulating the search query to identify one or more atoms. The method also includes identifying an initial set of documents from a search index based on the one or more atoms. The method further includes computing preliminary scores for each document in the initial set of documents using a simplified scoring function and pre-computed stores stored in the search index for document/atom pairs for the one or more atoms and the initial set of documents. The method also includes selecting a pruned set of documents from the initial set of documents based on the preliminary scores. The method further includes computing a ranking score for each document in the pruned set of documents using a full ranking algorithm to provide a set of ranked documents. The method still further includes providing search results for presentation to an end user based on the set of ranked documents.

In another embodiment of the present invention, as aspect is directed to a computerized system including at least one processor and one or more computer storage media. The system includes a query reformulation component that analyzes a received search query to identify one or more atoms based on terms contained in the received search query and generates a reformulated query. The system also includes a document matching component that queries a search index using the reformulated query to identify an initial set of matching documents. The system further includes a document pruning component that computes a preliminary score for each document from the initial set of matching documents using a simplified scoring function and identifies a pruned set of documents based on the preliminary scores. The system still further includes a final document ranking component that computes a ranking score for each document in the pruned set of documents using a full ranking algorithm.

A further embodiment of the present invention is directed to a method for providing search results in response to a search query using a staged process. The method includes receiving a search query and identifying one or more atoms from the search query. The method also includes identifying an initial set of documents containing the one or more atoms, computing a preliminary score for each document in the initial set of documents using a simplified scoring function, and selecting a subset of documents for further processing based on the preliminary scores. The method further includes computing a ranking score for each document in the subset of document using a final ranking algorithm. The method still further includes providing a set of search results based on the ranking scores.

In addition to the embodiments described above, methods for identifying relevant atoms from documents and indexing atom/document pairs is also described herein. For instance, atoms, which may be categorized as unigrams, n-grams, or n-tuples, are identified or extracted from documents. An information metric is calculated for each atom/document pair. The computation of the information metric can be based on many factors, and can even be done by a machine-learning tool that is able to learn how information metrics are calculated. A threshold is used to discard those atom/document pairs, based on the information metric, that are thought to not be as relevant or useful as other atom/document pairs in resolving a query. Those that are thought to be most relevant are indexed in a search index for future use when search queries are received.

According to a first aspect of the present invention, a method is provided for populating one or more search indexes with atoms identified in a plurality of documents. The method includes identifying a set of documents to be indexed in a search index, and for each document in the set of documents, identifying a plurality of atoms, the plurality of atoms comprising one or more unigrams, one or more n-grams, and one or more n-tuples. Also, the method includes based on the identified set of documents and the plurality of atoms, generating a list of atom/document pairs, and computing an information metric for each atom/document pair, wherein the information metric represents a ranking of the atom in relation to the particular document. Additionally, the method includes based on the information metric for each atom/document pair, selecting a subset of the atom/document pairs that are most relevant to the particular document from which the atoms were identified. The method further includes populating the search index using the subset of the atom/document pairs for the particular document.

According to a second aspect of the present invention, one or more computer-storage media storing computer-useable instructions are provided that, when used by a computing device, cause the computing device to perform a method for populating one or more search indexes with atoms identified in a plurality of documents. The method includes identifying a plurality of atoms from a first document of a plurality of documents that are to be indexed, classifying each of the plurality of atoms as one or more of a unigram, an n-gram, or an n-tuple, and computing an information metric for each of the plurality of atoms in relation to the first document. Further, the method includes determining whether the information metric for each of the plurality of atoms meets a predetermined threshold. The atoms that meet the predetermined threshold are those that are most relevant in relation to the first document. The method also includes discarding the atoms that do not meet the predetermined threshold, and incorporating the atoms that meet the predetermined threshold in relation to the first document into the one or more search indexes.

According to a third aspect of the present invention, one or more computer-storage media storing computer-useable instructions are provided that, when used by a computing device, cause the computing device to perform a method for populating one or more search indexes with atoms identified in a plurality of documents. The method includes extracting a plurality of atoms from a document, the plurality of atoms comprising one or more unigrams, one or more n-grams, and one or more n-tuples, and for each of the plurality of atoms, calculating an information metric that represents a ranking for a particular atom in relation to the document. The calculation of the information metric is based on one or more of a frequency of the atom in the document, a proximity of two or more terms of the atom in the document, a relatedness of the two or more terms of the atom, or whether the two or more terms of the atom have previously been linked together as evidenced by an inspection of query logs. The method further includes determining an information metric threshold. The atom/document pairs whose information metric meets or exceeds the information metric threshold are indexed. Also, the method includes discarding a portion of the atom/document pairs based on the information metrics. The information metrics corresponding to the discarded atom/document pairs are below the information metric threshold. One or more search indexes are populated by indexing the atom/document pairs whose information metrics meet or exceed the information metric threshold, wherein the unigrams, the n-grams, and the n-tuples are separately indexed. The one or more search indexes are accessed to identify relevant documents for the atoms in a query.

Having described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 3:
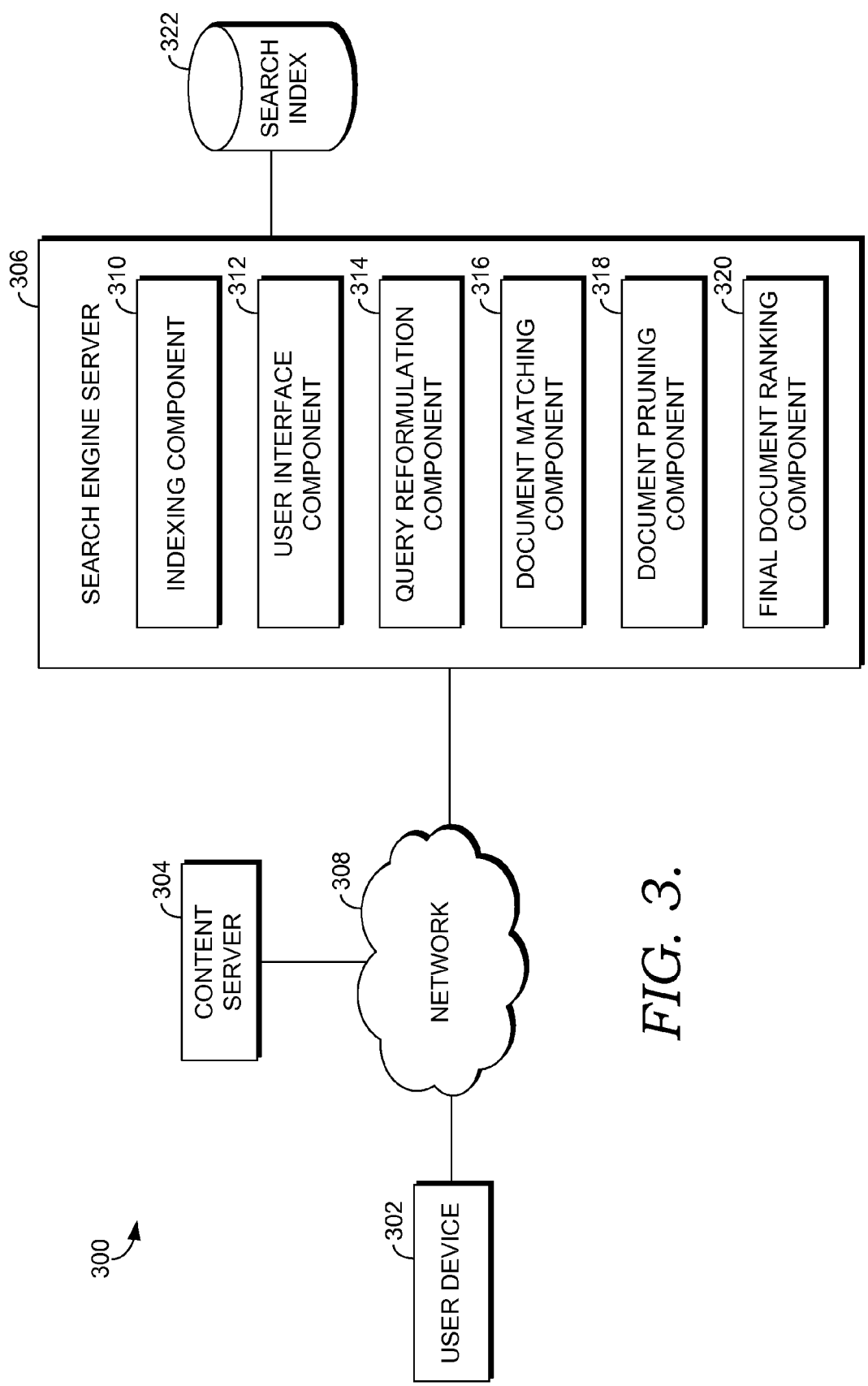
FIG. 3 is a block diagram of an exemplary system in which embodiments of the present invention may be employed.

Referring now to FIG. 3, a block diagram is provided illustrating an exemplary system 300 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 300 may include a user device 302, content server 304, and search engine server 306. Each of the components shown in FIG. 3 may be any type of computing device, such as computing device 100 described with reference to FIG. 1, for example. The components may communicate with each other via a network 308, which may include, without limitation, one or more local area networks (LANs) and/or wide area networks (WANs). Such networking environments are commonplace in offices, enterprise-wide computer networks, intranets, and the Internet. It should be understood that any number of user devices, content servers, and search engine servers may be employed within the system 300 within the scope of the present invention. Each may comprise a single device or multiple devices cooperating in a distributed environment. For instance, the search engine server 306 may comprise multiple devices arranged in a distributed environment that collectively provide the functionality of the search engine server 306 described herein. Additionally, other components not shown may also be included within the system 300.

The search engine server 306 generally operates to receive search queries from user devices, such as the user device 302, and to provide search results in response to the search queries. The search engine server 306 includes, among other things, an indexing component 310, a user interface component 312, a query refinement component 314, a document matching component 316, a document pruning component 318, and a final document ranking component 320.

The indexing component 310 operates to index data regarding documents maintained by content servers, such as the content server 304. For instance, a crawling component (not shown) may be employed to crawl content servers and access information regarding documents maintained by the content servers. The indexing component 310 then indexes data regarding the crawled documents in the search index 322. In embodiments, the indexing component 310 indexes atoms found in documents and scoring information for documents in which each atom is found indicating the importance of the atom in the context of the document. Any number of algorithms may be employed to calculate a score for an atom found in a document. By way of example only, the score may be based on term-frequency inverse-document frequency (TF/IDF) functions as known in the art. For instance, the BM25F ranking function may be employed. The scores generated for document/atom pairs are stored as pre-computed scores in the search index 322.

In embodiments, the indexing component 310 analyzes each document to identify terms, n-grams, and n-tuples and to determine which of these atoms should be indexed for the document. During processing of documents to be indexed, statistics about query distribution, term distribution, and/or the simplified scoring function to be used during the funnel process may be used to statistically select the best set of atoms to represent the document. These selected atoms are indexed in the search index 322 with the pre-computed scores, which allows for efficient pruning of documents early in the funnel process.

Although not required, in some embodiments of the present invention, the search index 322 may include both a reverse index (ordered by atom) and a forward index (ordered by document). The reverse index may include a number of posting lists, each posting list being directed to an atom and listing documents containing the atom with the pre-computed score for each document/atom pair. As will be described in further detail below, the reverse index and forward index may be employed at different stages of the funnel process.

The user interface component 312 provides an interface to user devices, such as the user device 302, that allows users to submit search queries to the search engine server 306 and to receive search results from the search engine server 306. The user device 302 may be any type of computing device employed by a user to submit search queries and receive search results. By way of example only and not limitation, the user device 302 may be a desktop computer, a laptop computer, a tablet computer, a mobile device, or other type of computing device. The user device 302 may include an application that allows a user to enter a search query and submit the search query to the search engine server 306 to retrieve search results. For instance, the user device 302 may include a web browser that includes a search input box or allows a user to access a search page to submit a search query. Other mechanisms for submitting search queries to search engines are contemplated to be within the scope of embodiments of the present invention.

When a search query is received via the user interface component 312, the query reformulation component 314 operates to reformulate the query. The query is reformulated from its free text form into a format that facilitates querying the search index 322 based on how data is indexed in the search index 322. In embodiments, the terms of the search query are analyzed to identify atoms that may be used to query the search index 322. The atoms may be identified using similar techniques that were used to identify atoms in documents when indexing the documents in the search index 322. For instance, atoms may be identified based on the statistics of terms and query distribution information. The query reformulation component 314 may provide a set of conjunction of atoms and cascading variants of these atoms.

The document matching component 316 employs the reformulated query to query the search index 322 and identify a set of matching documents. For instance, the reformulated query may include two or more atoms and the document matching component 316 may retrieve the intersection of those atoms' posting lists to provide an initial set of matching documents.

The document pruning component 318 operates by pruning documents from the initial set of matching documents. This may include computing a preliminary score for each document from the initial set of matching documents using the pre-computed scores stored in the search index 322 for document/atom pairs. The preliminary score may be based on a simplified scoring function that is tuned for performance and recall. In some embodiments, the simplified scoring function used to generate the preliminary score is built based on the full ranking algorithm that is subsequently used to provide a final set of ranked documents. As such, the simplified scoring function serves as an approximation of the final ranking algorithm. For instance, an approach such as that described in U.S. patent application Ser. No. 12/951,659, entitled "DECOMPOSABLE RANKING FOR EFFICIENT PRE-COMPUTING" may be employed for building the simplified scoring function. In some embodiments, the simplified scoring function contains a subset of the ranking features from the final ranking algorithm.

A number of different approaches may be used by the document pruning component 318 to prune the initial set of documents. In some embodiments, the document pruning component 318 may retain a predetermined number of matches from the initial set of documents while removing other documents from consideration (i.e., the top N matches). For instance, the document pruning component 318 may retain a thousand documents having the highest preliminary scores. The number of matches retained by the document pruning component 318 may be based on the fidelity confidence of the simplified scoring function used to generate the preliminary scores. The fidelity confidence represents the ability of the simplified scoring function to provide a set of documents that matches the set of documents that would be provided by the full ranking algorithm. For instance, it may take, on average, 1200 documents from the simplified scoring function to get the top 1000 documents that would be provided by the final ranking algorithm. In other embodiments, instead of retaining a predetermined number of documents, the document pruning component 318 may retain documents having a preliminary score above a certain threshold.

In some embodiments, the document matching component 316 and the document pruning component 318 may be closely coupled such that the document matching and pruning are combined into a single process for multiple iterations. For instance, preliminary scores may be computed as matching documents are identified and used to remove documents that would be very likely to be rejected by the full ranking algorithm.

In some embodiments, a search index using tiered posting lists such as that described in U.S. patent application Ser. No. 12/951,799, entitled "TIERING OF POSTING LISTS IN SEARCH ENGINE INDEX" may be employed to facilitate this matching/pruning process. Each posting list would be associated with a given atom and would include tiers ordered based on pre-computed scores assigned to documents representing the relevance of the given atom to the context of each document. Within each tier, the postings may be internally ordered by document. Using such a search index, the document matching component 314 could retrieve an initial set of documents using a first tier (having the highest pre-computed scores) and prune the initial set of documents using the simplified scoring function. If a sufficient number of documents are provided, the matching/pruning process may end. Alternatively, if a sufficient number of documents are not provided, matching and pruning may be iteratively performed on lower level tiers until a sufficient number of documents are retained.

The set of documents retained by the matching and pruning process provided by the document matching component 316 and the document pruning component 318 are evaluated by the final document ranking component 320 to provide a final set of ranked documents. The final document ranking component 320 employs a full ranking algorithm that may operate on the original search query and the set documents retained by the matching and pruning process. The full ranking algorithm employs more ranking features and more data from the documents than was used by the simplified scoring function employed during the pruning process. As such, the full ranking algorithm is a more expensive operation that requires more processing and takes a longer period of time to compute. However, because the set of candidate documents has been pruned, the full ranking algorithm is performed on a smaller set of documents.

The final document ranking component 320 provides a final set of ranked documents, which are indicated to the user interface component 312. The user interface component 312 then communicates search results that include at least a portion of the final set of ranked documents to the user device 302. For instance, the user interface component 312 may generate or otherwise provide a search engine results page (SERP) listing search results based on the final set of ranked documents.

Turning next to FIG. 4, a flow diagram is provided that illustrates an overall method 400 for employing a staged process to return search results to a search query in accordance with an embodiment of the present invention. The staged process begins with a pre-compute/index stage, as shown at block 402. This stage is an offline phase, that is, it is performed separate from any received search query. In the pre-compute/index stage 402, documents are crawled and data regarding the documents are indexed in a search index. A process for indexing document data during the pre-computer/index stage 402 in accordance with one embodiment is discussed in further detail below with reference to FIG. 5.

The stages shown in FIG. 4 after the pre-compute/index stage 402 comprise an online phase, in which a search query is received and search results are returned in response. The first stage of the online phase is a matching stage, as shown at block 404. During the matching stage 404, a search query is received and reformulated, and the reformulated query is used to identify matching documents from the search index. A process for identifying matching documents during the matching stage 404 in accordance with one embodiment is discussed in further detail below with reference to FIG. 6.

The next stage after matching is a pruning stage, as shown at block 406. The pruning stage 406 takes the initial set of documents from the matching stage 404 and determines a preliminary score for each document using a simplified scoring function. Based on the preliminary score, documents are pruned from the initial set of documents. A process for pruning documents from the initial set of matching documents in accordance with one embodiment is discussed in further detail below with reference to FIG. 7.

In some embodiments, the matching stage 404 and pruning stage 406 may be interleaved. In particular, pruning may be performed as matching documents are identified to early reject candidates from further consideration where the preliminary score indicates that the documents would be very likely rejected by the final ranking algorithm.

The set of candidate documents retained after the matching stage 404 and the pruning stage 406 are further evaluated during a final ranking stage, as shown at block 408. During the final ranking stage 408, a full ranking algorithm is employed to determine a final score for the retained documents. In some embodiments, the full ranking algorithm may be performed over the original search query and data for each of the retained documents. The full ranking algorithm may employ a number of different ranking features to determine the final set of ranked documents. Search results are provided in response to the search query based on the final set of ranked documents, as shown at block 410.

Turning now to FIG. 5, a flow diagram is provided that illustrates a method 500 for pre-computing scores for document/atom pairs and indexing data in accordance with an embodiment of the present invention. Initially, a document is accessed, as shown at block 502. For instance, a crawler may be employed to crawl a document and retrieve document data. The document is processed at block 504. The document is processed to identify atoms contained within the document. As noted above, the process may include analyzing the text of the document to identify terms, n-grams, and n-tuples and to determine which of these atoms should be indexed for the document. Statistics about query distribution, term distribution, and/or the simplified scoring function to be used during the funnel process may be used to statistically select the best set of atoms to represent the document.

A score is generated for each atom identified within the document, as shown at block 506. The score represents the importance of the atom in the context of the document. Any number of algorithms may be employed to calculate a score for an atom found in a document. By way of example only, the score may be based on term-frequency inverse-document frequency (TF/IDF) functions as known in the art. For instance, the BM25F ranking function may be employed.

Data is indexed in a search index, as shown at block 508. This may include storing information regarding atoms found in the document and the score for each document/atom pair. These scores comprise pre-computed scores that may be used during the funnel process. In some embodiments, posting lists are created for each atom. Each posting list may include a list of the documents containing the atom and an indication of the pre-computed score for each document/atom pair.

Referring next to FIG. 6, a flow diagram is provided that illustrates a method 600 for retrieving an initial set of matching documents during a matching phase in accordance with an embodiment of the present invention. As shown at block 602, a search query is initially received. The search query may contain one or more search terms entered by a user employing a user device.

The received search query is reformulated, as shown at block 604. In particular, the terms of the search query are analyzed to identify one or more atoms that may be used to query the search index. This analysis may be similar to the analysis used to identify atoms in documents when indexing document data. For instance, statistics of terms and search queries may be employed to identify atoms in the search query. The reformulated query may comprise a set of conjunction of atoms and cascading variants of these.

The reformulated query is used to identify a set of matching documents from the search index, as shown at block 606. In particular, the atoms identified from the original query are used to query the search index and identify matching documents. As indicated above, the search index may comprise posting lists for various atoms identified in indexed documents. The posting lists corresponding with atoms identified by the reformulated query may be identified and used to identify matching documents. For instance, the intersection of posting lists for multiple atoms from the reformulated query may provide the initial set of matching documents.

Turning to FIG. 7, a flow diagram is provided that illustrates a method 700 for pruning documents from an initial set of matching documents during a pruning stage in accordance with an embodiment of the present invention. As shown at block 702, a preliminary score is computed for each document using pre-computed scores stored in the search index. This may include retrieving the pre-computed scores for a document for each atom and using the pre-computed scores in a simplified scoring function to generate a preliminary score for the document. The simplified scoring function may be established in a manner such that it provides an estimate of the final score that would be provided by a full ranking algorithm. For instance, the simplified scoring function may include a subset of the features used by the full ranking algorithm. In some embodiments, the simplified scoring function is defined using a process such as that described by U.S. patent application Ser. No. 12/951,659, entitled "DECOMPOSABLE RANKING FOR EFFICIENT PRECOMPUTING."

Documents are pruned from the initial set of matching documents based on the preliminary scores, as shown at block 704. In some embodiments, the top N documents are retained, that is, the N documents having the highest preliminary score are retained for further processing. The number of documents retained may be based on the fidelity of the simplified scoring function used to compute the preliminary scores. The fidelity of the simplified scoring function represents that ability of the simplified scoring function to provide a ranked set of documents similar to what would be provided by the final ranking algorithm. If the correlation between the simplified scoring function and the final ranking algorithm including the error in the simplified scoring function is known, the knowledge could be used to determine the number of documents to retain from the pruning stage. For instance, if it is desired to provide 1000 search results and it is known that, on average over all queries, the top 1200 documents from the simplified scoring function will include the top 1000 documents from the final ranking algorithm, the top 1200 documents will be retained from the pruning stage.

In some embodiments of the present invention, the funnel process may employ a search index that includes a reverse index and a forward index. The reverse index would be ordered by atom. This would facilitate fast retrieval of data during the matching and pruning stages of the funnel process. In particular, when a search query is received and atoms from the search query are identified, the posting lists in the reverse index corresponding with the atoms identified from the search query may be quickly accessed and used to identify matching documents and retrieve the pre-computed scores used by the simplified scoring function. The forward index would be ordered by document. This would facilitate the final ranking stage of the funnel process. In particular, a pruned set of documents would be provided as a result of the matching and pruning stages. The pruned set of documents would be relatively small. As such, the forward index would store document data that would be retrieved for the documents in the pruned set of documents and used by the final ranking algorithm to provide the final set of ranked documents. In some embodiments, the forward index may be structured as described in U.S. patent application Ser. No. 12/951,747, entitled "EFFICIENT FORWARD RANKING IN A SEARCH ENGINE." Additionally, in some embodiments, a hybrid distribution model may be employed for the reverse and forward index such as that described in U.S. patent application Ser. No. 12/951,815, entitled "HYBRID DISTRIBUTION MODEL FOR SEARCH ENGINE INDEXES" (which is herein incorporated by reference in its entirety).

Figure 8:
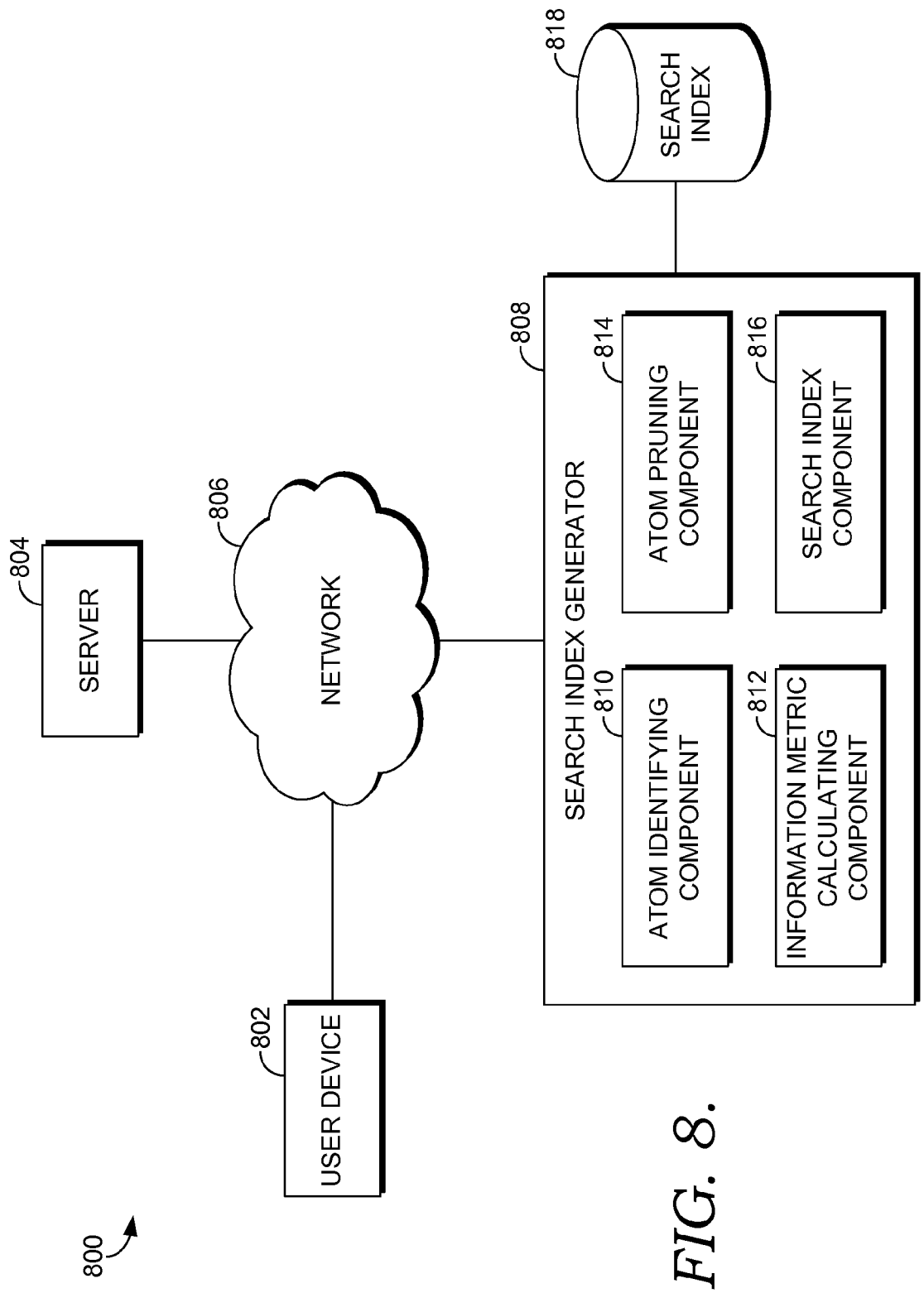
FIG. 8 illustrates an exemplary system in which embodiments of the present invention may be employed.

Turning now to FIG. 8, an exemplary system is illustrated in which embodiments of the present invention may be employed. While some embodiments of the present invention, as discussed herein, are directed to a funnel process that evaluates and prunes away document candidates in multiple stages, other embodiments are directed to identifying the most useful and relevant atoms in documents and indexing those atoms in a search index in relation to a particular document. Atoms may take many forms, including terms or unigrams, n-grams, or n-tuples. While only single terms are typically indexed, here, as will be discussed below, some types of atoms have multiple terms and as such, groups of terms may be indexed together. As used herein, unigrams map to a single symbol or word as defined by the tokenizer technology being used. As such, a unigram may be a single word found in a document. An n-gram is a sequence of "n" consecutive or almost consecutive terms extracted from a document. An n-gram may be tight or loose. An n-gram is said to be tight if it corresponds to a run of consecutive terms. A loose n-gram contains terms in the order they appear in the document, but the terms are not necessarily consecutive. Loose n-grams are typically used to represent a class of equivalent phrases that differ by insignificant words (e.g., "if it rains I'll get wet" as compared to "if it rains then I'll get wet"). A bigram for instance is two words with "n" equal to two. Similarly, a trigram is three words with "n" equal to three. An n-tuple, as used herein, is a set of "n" terms that co-occur in a document, and whose order is independent. The atoms identified in the documents are indexed into one or more search indexes. In one embodiment, there are separate indexes for the unigrams, n-grams, and n-tuples.

Returning to FIG. 8, it should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 800 may include a user device 802, an index server 804, a search index generator 808, and a search index 818. Each of the components shown in FIG. 8 may be any type of computing device, such as computing device 100 described with reference to FIG. 1, for example. The components may communicate with each other via a network 806, which may include, without limitation, one or more local area networks (LANs) and/or wide area networks (WANs). Such networking environments are commonplace in offices, enterprise-wide computer networks, intranets, and the Internet. It should be understood that any number of user devices, index servers, search index generators, and search indexes may be employed within the system 800 within the scope of the present invention. Each may comprise a single device or multiple devices cooperating in a distributed environment. For instance, the index server 804 may comprise multiple devices arranged in a distributed environment that collectively provide the functionality of the index server 804 described herein. Also, as described herein, there may be multiple search indexes. These may be stored in the search index 818 or may be stored in separate locations. Additionally, other components not shown may also be included within the system 800.

The index server 804 generally operates to receive search queries from user devices, such as the user device 802, and to provide search results in response to the search queries by searching one or more search indexes. The search index generator 808 includes, among other things, an atom identifying component 810, an information metric calculating component 812, an atom pruning component 814, and a search index component 816. Generally, the search index generator 808 is responsible for either generating or populating existing search indexes with atom/document pairs that are determined to be the most useful and relevant for future queries. The atom identifying component 810 is generally responsible for examining documents and extracting the individual terms from the document. Additionally, the atom identifying component 810 identifies those atoms that are n-grams and n-tuples. For instance, the atom identifying component 810, by determining the location of various terms in relation to each other, may be able to identify an n-gram. As mentioned, terms that comprise an n-tuple are location independent, and thus may be located anywhere in the document. The description of FIGS. 9A, 9B, and 9C below further explains n-grams and n-tuples.

The information metric calculating component 812 computes an information metric. Atoms identified in the documents may be selected as the most relevant or useful for a particular document based on an information metric. Generally, an information metric is a ranking for an atom in relation to a particular document from which it was identified or extracted. The information metric estimates an atom's usefulness in resolving an average query. In one embodiment, the information metric calculating component 812 utilizes an algorithm to compute the information metric for each atom/document pair. Various factors may be used in conjunction with the algorithm to compute the information metric. For exemplary purposes only, these factors may include an information score, the frequency of the atom in the document, separation of words if the atom is an n-gram or n-tuple, a quantity of times that the terms in the atom appear individually and the quantity of times that the terms appear together, and whether the atom or terms that comprise the atom appear in query logs. This last factor demonstrates that the terms of the atom are associated in some way, and that the terms have previously been searched. As far as the quantity of times that the terms appear in the document, if each word in the atom appears many times but are not close in distance to each other, this may signify that the words are located in the same document only by coincidence without a deeper meaning. It becomes more significant if the words appear closer to each other than as would be expected by chance.

The atom pruning component 814 is responsible for pruning the number of atom/document pairs for each document so those atoms that are not likely to be relevant or important for a certain document are not indexed, thus taking up excess storage space. For a document that has 400 distinct words, and thus there being 400 entries in a search index, if bigrams are also identified in this document, there would be 80,000 pairs of words for this single document. This number grows much larger if trigrams and n-tubles are also indexed. Not only is the number of atom/document pairs increasingly large, but the position of each term may also be stored in the search index, and this takes up storage space as well as the pairs themselves. As mentioned, based on many factors, some of which are listed above, an algorithm computes an information metric that is later used to determine whether a particular atom/document pair is to be indexed or not. This determination is based on a threshold value. This threshold value, in one embodiment, is set by examining prior runs, such as from the previous day, and also from initial testing. There are many ways that the threshold value can be computed, and the above ways are provided for exemplary purposes only. The threshold value, thus is typically a predetermined value. As such, based on the threshold value, the atom pruning component 814 inspects the information metric for each atom/document pair and makes the determination as to whether each pair should be indexed or discarded.

Once the atom pruning component 814 has pruned the number of atom/document pairs, as described above, the search index component 816 may either generate a search index or add entries to an existing search index. In one instance, a search index may be generated during the process described above, and those entries in the search index may be incorporated into an existing search index, such as a master index. Search index 818, in one embodiment, stores multiple search indexes. Also, as previously mentioned, there may be separate search indexes for the various types of atoms, including a unigram index, an n-gram index, and an n-tuple index. The unigram index is a mapping from a given term to a list of document identification/ranking records. In one embodiment, the pruning process does not apply to unigrams, as the amount of unigrams is typically manageable, and thus may not need to be pruned, or at least not pruned as much as n-grams and n-tuples. The n-gram index includes n-grams identified in the documents for a given "n" by a sliding window algorithm. For example, for a term stream t1t2t3t4t5, and where n=2, n-gram atoms include (t1t2), (t2t3), (t3t4), and (t4t5). Thus, from a string a five words where n=2, there are four atoms that result. These atoms are indexed and stored with a (docID, ranking) record where the ranking is the approximation of the ranking of the two consecutive terms in the document.

In some embodiments, the ranking, or the information metric is not stored in the index, but is instead only used to determine which atoms are indexed and which are discarded. The n-tuple index is similar to the n-gram index as described herein, except that there are exponentially more n-tuples that are identified from documents, as the location of the terms of the n-tuples may be considered to be irrelevant. As such, the n-tuples are typically pruned more than n-grams and unigrams. Further, in some cases, n-grams and n-tuples may be duplicated, and thus the duplicates are discarded during the pruning process. Once identified and indexed, the atoms (unigrams, n-grams, n-tuples), in one embodiment, are stored in a dictionary using a priority hash index, such as that described in U.S. patent application Ser. No. 12/980,582, entitled "PRIORITY HASH INDEX" (which is herein incorporated by reference in its entirety).

FIGS. 9A, 9B, and 9C illustrate examples of entries in a unigram search index, an n-gram search index, and an n-tuple search index, respectively, in accordance with embodiments of the present invention. The embodiment of FIGS. 9A, 9B, and 9C uses a sample string of terms of "Holistic Approach in Southern Sweden." FIG. 9A illustrates the unigrams 900 that are identified from this string of terms. As shown, there are five identified unigrams, each consisting of a single term. FIG. 9B illustrates n-grams 910 that have been identified from the sample string of terms. As n-grams are near or next to each other, seven n-grams are identified, which is a higher quantity than the unigrams identified. FIG. 9C illustrates the n-tuples 920 that are identified from the sample string of terms. As shown, significantly more n-tuples are identified than either unigrams or n-grams, as n-tuples may be paired or otherwise matched together even if they are not next to or near each other in a document. Thirteen n-tuples have been identified from the sample string of terms consisting of five terms. FIGS. 9A, 9B, and 9C are shown to illustrate how the quantity of n-tuples is typically significantly greater than the quantity of either unigrams or n-grams.

Referring to FIG. 10, a flow diagram is shown of a method 1000 for populating one or more search indexes with atoms identified in a plurality of documents, in accordance with an embodiment of the present invention. Initially, a set of documents to be indexed in a search index is identified at step 1010. Documents are generally indexed such that when a search query is received, the most relevant documents can be easily found for the user by accessing the search index. At step 1012, atoms are identified in each of the documents. As mentioned, atoms may be one or more of a unigram, an n-gram, or an n-tuple. Unigrams are generally single symbols or terms, while n-grams, when "n" is greater than one, are multiple terms or symbols that are located next to or near each other in a document. For instance, n-grams may be a sequence of consecutive or almost consecutive terms extracted from a particular document, where "n" is the quantity of consecutive or almost consecutive terms. N-tuples are multiple terms or symbols that co-occur in the same document but are not necessarily located next to or near each other in a document. In one instance, these terms that comprise an n-tuple may not be close to each other at all, such as in different parts of a document. Further, n-tuples are order independent.

At step 1014, a list of atom/document pairs is generated. An atom/document pair is an atom that was identified in a document, and a document identification corresponding to the document from which the atom was identified. An information metric is computed for each atom/document pair at step 1016. The information metric represents a ranking of the atom in relation to the particular document, such as how relevant the atom is in relation to the document in resolving a search query. In one embodiment, a machine-learning tool is used to compute the information metric for each atom, in addition to selecting the most relevant atom/document pairs that are determined, based on the information metric and other factors, to be most relevant to the document from which the atoms were identified. The computation of the information metric may use an algorithm that utilizes various factors. For exemplary purposes only, these factors may include an information score for a word in any corpus, the frequency of the word or words that comprise the atom in the document, the separation of the words, how many times the word or words appear individually and how many times they appear together, and if and how frequent the atom appears in query logs. There are other factors that may be used and are contemplated to be within the scope of the present invention.

A subset of the atom/document pairs is selected at step 1018 as being most relevant to the particular document. This selection at step 1018 is based on the information metric computed for the atom/document pairs. Typically, a threshold is determined such that those information metrics above the threshold are considered relevant, and those below may not be considered relevant or at least not as relevant. In one embodiment, selecting the subset of atom/document pairs comprises using a pruning algorithm to prune or limit the quantity of atom/document pairs to a smaller quantity such that the atom/document pairs that are less relevant than other more relevant atom/document pairs are discarded, and thus are not indexed. At step 1020, the search index is populated using the subset of the atom/document pairs for the particular document. As mentioned, all atom/document pairs may be initially indexed in a separate index, and then only those that are selected as being most relevant are then populated or indexed into the master search index. Additionally, as mentioned, there may be more than one search index, and thus in one embodiment, unigrams are indexed in a unigram index, n-grams are indexed in an n-gram index, and n-tuples are indexed in an n-tuple index.

In one embodiment, a search query is received. The search query may be reformatted into at least one of a unigram, an n-gram, an n-tuple, or a combination thereof. The search index into which the atoms have been indexed is accessed to determine the most relevant document for the reformatted search query.

FIG. 11 is a flow diagram showing a method 1100 for populating one or more search indexes with atoms identified in a plurality of documents, in accordance with an embodiment of the present invention. Initially at step 1110, atoms are identified from a first document. Each of these atoms is classified at step 1112 as a unigram, an n-gram, an n-tuple, or a combination thereof. At step 1114, an information metric is computed for each of the identified atoms. As mentioned, the information metric represents a ranking of the atom/document pair as it is useful in resolving an average query. Factors used in computing the information metric include, but are not limited to, a frequency of the atom in the first document, a proximity in location of two or more terms of the atom in the first document, a relatedness of the terms of the atom, and whether the terms of the atom have previously been linked together as evidenced by an inspection of query logs. At step 1116, it is determined whether the information metric for each of the atoms meets a predetermined threshold. The atoms that meet the threshold are those that are thought or known to be most relevant in relation to the first document. The threshold may be arbitrary in one embodiment, or in another embodiment may be purely based on numbers such as how many atoms are to be indexed. In yet another embodiment, the threshold is based on a previous trial that has been performed regarding atoms that have been found relevant for a particular document.

At step 1118, atoms that do not meet the predetermined threshold are discarded. The atoms that do meet the threshold are incorporated into one or more search indexes, shown at step 1120. In one embodiment, the one or more search indexes include a unigram index, an n-gram index, and an n-tuple index. In one embodiment, and as previously mentioned, all unigrams identified in the documents to be indexed may be incorporated into a search index and thus may not be pruned. Additionally, the same may be true for n-grams in one embodiment. Alternatively, the n-grams may be pruned to a certain degree but not as much as the n-tuples. As such, a greater percentage of n-tuples may be discarded than n-grams and unigrams. Also, some n-tuples may also be identified as n-grams, and thus duplicates may be discarded during the pruning process.

A further embodiment of FIG. 11 comprises the identification of atoms from a second document. Each of these atoms are classified as a unigram, an n-gram, an n-tuple, or a combination thereof. An information metric is computed for each of the atoms in relation to the second document. Some atoms may be identical or similar to those identified from the first document, but may have different information metrics based on the different documents from which the atoms were identified. It is then determined whether the information metric for each of the atoms meets a predetermined threshold. Those that do are considered to be most relevant in relation to the second document. Those that do not meet the threshold are discarded. The atoms that do meet the threshold are incorporated into the search indexes.

Figure 12:
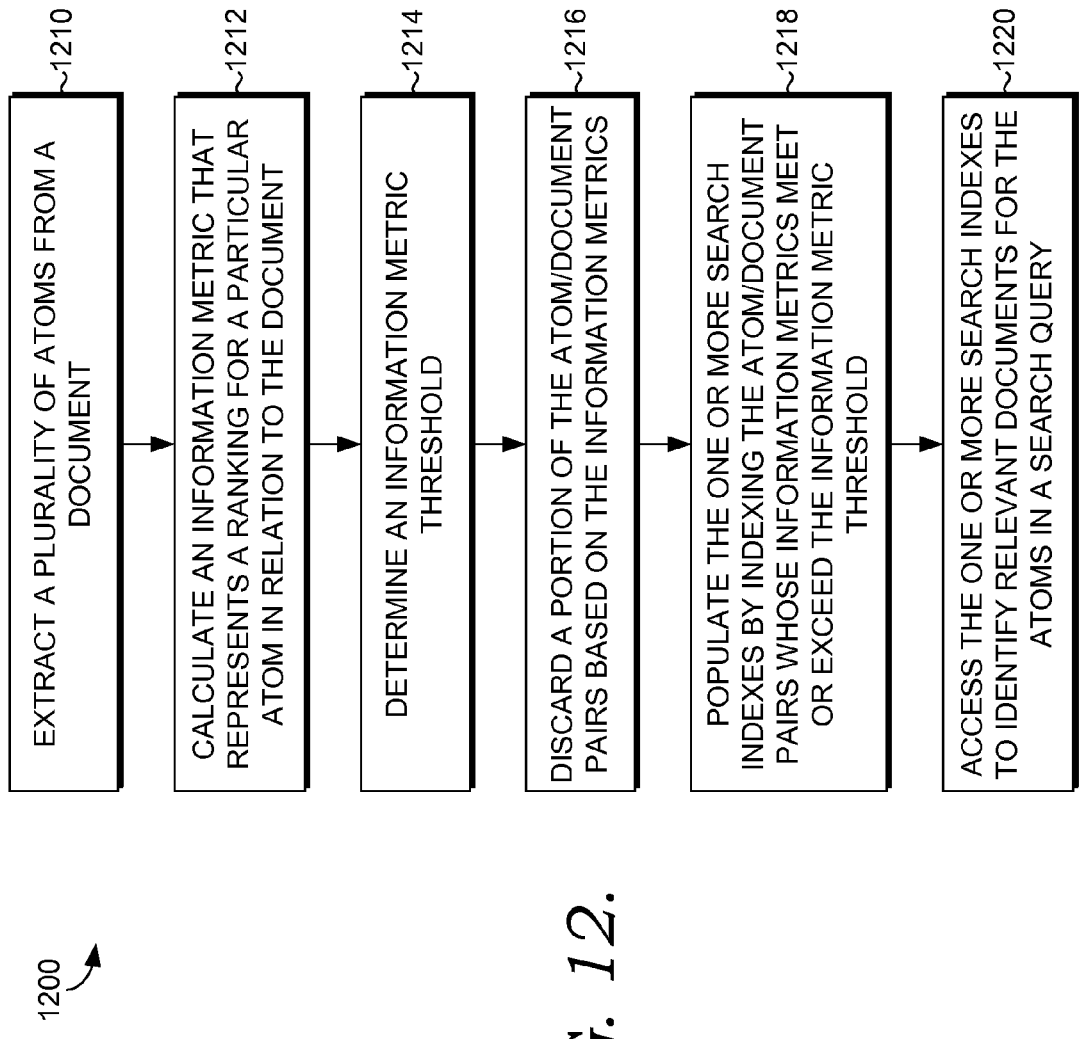
FIG. 12 is a flow diagram showing a method for populating one or more search indexes with atoms identified in a plurality of documents, in accordance with an embodiment of the present invention.

FIG. 12 is a flow diagram showing a method 1200 for populating one or more search indexes with atoms identified in a plurality of documents, in accordance with an embodiment of the present invention. At step 1210, atoms are extracted from a document. The atoms may be classified as a unigram, an n-gram, or an n-tuple. For each of the atoms, an information metric is calculated at step 1212. The information metric represents a ranking for a particular atom in relation to the document. Further, the calculation of the information metric may be based on, for example, a frequency of the atom in the document, a proximity of terms of the atom in the document, a relatedness of the terms of the atom, and whether the terms of the atom have previously been linked together as evidenced by inspection of query logs. Other factors may also be used and are contemplated to be within the scope of the present invention.

At step 1214, an information metric threshold is determined such that those atom/document pairs whose information metric meet or exceed the information metric threshold are indexed. At step 1216, a portion of the atom/document pairs is discarded based on the information metrics, such as if the information metric does not meet the threshold. One or more search indexes are populated at step 1218 with the atom/document pairs whose information metrics meet or exceed the information metric threshold. In one embodiment, unigrams, n-grams, and n-tuples are separately indexed. At step 1220, search indexes are accessed to identify relevant documents for atoms in a received search query.

As can be understood, embodiments of the present invention provide the computation of an information metric for each atom/document pair and using the information metric to determine which atom/document pairs to index and which to discard. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages, which are obvious and inherent to the system and method. It will be understood that certain features and subcombinations are of utility and may be employed without reference to other features and subcombinations. This is contemplated by and is within the scope of the claims.

What is claimed is:

1. A method for populating one or more search indexes with atoms identified in a plurality of documents, the method comprising:
    identifying a set of documents to be indexed in a search index;
    for each document in the set of documents, identifying a plurality of atoms, the plurality of atoms comprising one or more unigrams, one or more n-grams, and one or more n-tuples;
    based on the identified set of documents and the plurality of atoms, generating a list of atom/document pairs;
    computing an information metric for each atom/document pair, wherein the information metric represents a pre-computed ranking of the atom used during a search query in relation to the particular document;
    based on the information metric for each atom/document pair, selecting a subset of the atom/document pairs that are most relevant to the particular document from which the atoms were identified;
    populating the search index using the subset of the atom/document pairs for the particular document, wherein identifying relevant documents for the search query from the search index is based on a pruning algorithm that computes a preliminary score for each of the documents to select a subset of the set of documents based on the preliminary score, wherein the preliminary score is computed using the information metric pre-computed for each atom/document pair and a simplified scoring function that approximates a final ranking algorithm utilized in identifying the relevant documents.

2. The method of claim 1, wherein the search index comprises one or more search indexes, and wherein the one or more search indexes comprise a unigram index, an n-gram index, and a tuple index.

3. The method of claim 1, wherein a unigram is a single word or symbol.

4. The method of claim 1, wherein an n-gram is a sequence of consecutive or almost consecutive terms extracted from a particular document, wherein n is a quantity of consecutive terms.

5. The method of claim 1, wherein an n-tuple is a set of terms that co-occur in a particular document, wherein an order of the set of terms is independent, and wherein n is a quantity of terms.

6. The method of claim 1, wherein selecting a subset of the atom/document pairs that are most relevant to the particular document further comprises utilizing the pruning algorithm to prune a quantity of the atom/document pairs to a smaller quantity such that the atom/document pairs that are less relevant than other atom/document pairs are not indexed.

7. The method of claim 1, wherein a machine-learning tool is used to compute the information metrics for the atom/document pairs and for selecting the subset of the atom/document pairs that are most relevant to the particular document from which the atoms were identified.

8. The method of claim 1, further comprising:
    receiving the search query;
    reformatting the search query into at least one of one or more unigrams, one or more n-grams, or one or more n-tuples; and
    accessing the search index to determine, using the reformatted search query, the most relevant documents for the search query.

9. One or more hardware computer-storage media storing computer-useable instructions that, when used by a computing device, cause the computing device to perform a method for populating one or more search indexes with atoms identified in a plurality of documents, the method comprising:
    identifying a plurality of atoms from a first document of a plurality of documents that are to be indexed;
    classifying each of the plurality of atoms as one or more of a unigram, an n-gram, or an n-tuple;
    computing an information metric for each of the plurality of atoms in relation to the first document, wherein the information metric for a first atom identified in the first document represents a pre-computed ranking used during a search query for the first atom as to how useful the first atom is in relation to the first document in resolving the search query having the first atom;
    determining whether the information metric for each of the plurality of atoms meets a predetermined threshold, wherein the atoms that meet the predetermined threshold are those that are most relevant in relation to the first document;
    discarding the atoms that do not meet the predetermined threshold; and
    incorporating the atoms that meet the predetermined threshold in relation to the first document into the one or more search indexes, wherein identifying the first document from the one or more search indexes as relevant for the search query is based on a pruning algorithm that computes a preliminary score for the first document to select the first document based on the preliminary score, the first document is selected from a set of documents indexed in the one or more search indexes, wherein the preliminary score is computed using the information metric pre-computed for each atom/document pair and a simplified scoring function that approximates a final ranking algorithm utilized in identifying the first document as relevant for the search query.

10. The one or more computer-storage media of claim 9, wherein the one or more search indexes comprise a unigram index, an n-gram index, and an n-tuple index.

11. The one or more computer-storage media of claim 9, wherein the information metric is calculated at least by determining whether the terms that comprise the atom have previously been searched by inspecting query logs.

12. The one or more computer-storage media of claim 9, wherein all of the unigrams identified from the first document are incorporated into the one or more search indexes.

13. The one or more computer-storage media of claim 9, wherein a greater percentage of the n-tuples are discarded than the n-grams and the unigrams.

14. The one or more computer-storage media of claim 9, further comprising discarding the n-tuples that are already identified as n-grams.

15. The one or more computer-storage media of claim 9, wherein the computation of the information metric for each of the plurality of atoms is based on one or more of a frequency of the atom in the first document, a proximity of two or more terms of the atom in the first document, a relatedness of the two or more terms of the atom, or whether the two or more terms of the atom have previously been linked together as evidenced by an inspection of query logs.

16. The one or more computer-storage media of claim 9, further comprising:
- identifying a plurality of atoms from a second document;
- classifying each of the plurality of atoms as one or more of a unigram, an n-gram, or an n-tuple;
- computing an information metric for each of the plurality of atoms in relation to the second document;
- determining whether the information metric for each of the plurality of atoms meets a predetermined threshold, wherein the atoms that meet the predetermined threshold are those that are most relevant in relation to the second document;
- discarding the atoms that do not meet the predetermined threshold; and
- incorporating the atoms that meet the predetermined threshold in relation to the second document into the one or more search indexes.

17. One or more hardware computer-storage media storing computer-useable instructions that, when used by a computing device, cause the computing device to perform a method for populating one or more search indexes with atoms identified in a plurality of documents, the method comprising:
- extracting a plurality of atoms from a document, the plurality of atoms comprising one or more unigrams, one or more n-grams, and one or more n-tuples;
- for each of the plurality of atoms, calculating an information metric that represents a pre-computed ranking used in a search query for a particular atom in relation to the document;
- determining an information metric threshold, wherein the atom/document pairs whose information metric meets or exceeds the information metric threshold are indexed;
- discarding a portion of the atom/document pairs based on the information metrics, wherein the information metrics corresponding to the discarded atom/document pairs are below the information metric threshold;
- populating the one or more search indexes by indexing the atom/document pairs whose information metrics meet or exceed the information metric threshold, wherein the unigrams, the n-grams, and the n-tuples are separately indexed each in a different search index, and
- accessing the one or more search indexes to identify relevant documents for the atoms in a query, wherein identifying relevant documents is based at least in part on a pruning algorithm computes a preliminary score for documents of the atom/documents pair, wherein the preliminary score is computed using the information metric and a simplified scoring function that approximates a final ranking algorithm utilized in identifying the relevant documents.

18. The one or more computer-storage media of claim 17, wherein the information metric threshold is determined based on previous trial runs of determining most relevant documents for a particular search query.

19. The one or more computer-storage media of claim 17, wherein the atom/document pairs are stored in a dictionary using a priority hash index.

20. The one or more computer-storage media of claim 16, wherein less bandwidth is used when identifying most relevant documents for a particular search query and when using an n-gram search index and an n-tuple search index than using only a unigram search index.

* * * * *